United States Patent
Baer et al.

(10) Patent No.: US 9,813,147 B2
(45) Date of Patent: Nov. 7, 2017

(54) SYSTEMS AND METHODS FOR AUTOMATICALLY RE-RANGING A SATELLITE TERMINAL

(71) Applicant: Hughes Network Systems, LLC, Germantown, MD (US)

(72) Inventors: Matthew Benjamin Baer, Gaithersburg, MD (US); Yezdi Antia, North Potomac, MD (US); Javier Sanchez, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 449 days.

(21) Appl. No.: 14/589,637

(22) Filed: Jan. 5, 2015

(65) Prior Publication Data
US 2016/0195618 A1    Jul. 7, 2016

(51) Int. Cl.
*H04B 7/185*    (2006.01)

(52) U.S. Cl.
CPC ..... *H04B 7/18543* (2013.01); *H04B 7/18513* (2013.01)

(58) Field of Classification Search
CPC .. H04N 9/64; H04L 1/24; H04L 12/12; H04B 7/12; H04B 7/18517; H04B 1/40; H04B 7/18547; H04B 7/18519; H04B 7/18513; H04B 7/18504; H04B 7/18586; H04B 7/18543; H03D 7/16; H03D 1/40
USPC .................................................. 342/357.62
See application file for complete search history.

(56) References Cited

U.S. PATENT DOCUMENTS

| | | | | | |
|---|---|---|---|---|---|
| 4,739,407 | A | * | 4/1988 | Mack | H04N 9/64 348/638 |
| 4,789,948 | A | * | 12/1988 | von der Embse | H04L 1/24 375/327 |
| 4,956,864 | A | * | 9/1990 | Brockman | H04B 7/12 375/344 |
| 5,019,910 | A | * | 5/1991 | Filmer | H04B 7/18517 348/726 |
| 5,060,297 | A | * | 10/1991 | Ma | H03D 7/16 455/207 |

(Continued)

FOREIGN PATENT DOCUMENTS

WO    2010/147986    12/2010

OTHER PUBLICATIONS

International Search Report and the Written Opinion for International App No. PCT/US2016/012084, mailed Aug. 10, 2016, Authorized Officer: Lafitte-De Jong, Sandrine.

*Primary Examiner* — Bernarr Gregory
*Assistant Examiner* — Fred H Mull
(74) *Attorney, Agent, or Firm* — Sheppard Mullin; Daniel Yannuzzi; Jonathan Marina (57) ABSTRACT

Systems and methods are provided for automatically re-ranging a satellite terminal. A satellite system may comprise a satellite comprising an inroute channel and an outroute channel, and a terminal configured to receive an outroute signal from the satellite on the outroute channel and transmit an inroute signal to the satellite on the inroute channel. The satellite terminal may automatically determine when to perform ranging by monitoring the quality of the outroute signal; monitoring the quality of the inroute signal; and determining if there has been a sustained degradation in the monitored inroute signal quality or the monitored outroute signal quality.

22 Claims, 6 Drawing Sheets

(56) References Cited

U.S. PATENT DOCUMENTS

| | | | | |
|---|---|---|---|---|
| 5,742,639 A | * | 4/1998 | Fasulo, II | H04B 1/40 |
| | | | | 332/103 |
| 6,724,737 B1 | * | 4/2004 | Boyden | H04B 7/18517 |
| | | | | 370/316 |
| 6,760,566 B1 | * | 7/2004 | Wright | H04B 7/18513 |
| | | | | 370/318 |
| 6,941,138 B1 | * | 9/2005 | Chang | H04B 7/18504 |
| | | | | 455/12.1 |
| 8,447,226 B1 | * | 5/2013 | Kuether | H04B 7/18517 |
| | | | | 455/3.02 |
| 8,634,778 B1 | | 1/2014 | Dale | |
| 2003/0040274 A1 | * | 2/2003 | Dai | H04B 7/18543 |
| | | | | 455/13.4 |
| 2003/0112878 A1 | * | 6/2003 | Kloper | H04B 7/18547 |
| | | | | 375/259 |
| 2004/0033780 A1 | * | 2/2004 | Kelly | H04B 7/18519 |
| | | | | 455/11.1 |
| 2004/0209637 A1 | * | 10/2004 | Andenaes | H04B 7/18517 |
| | | | | 455/522 |
| 2009/0190491 A1 | * | 7/2009 | Miller | H04B 7/18513 |
| | | | | 370/252 |
| 2011/0007647 A1 | * | 1/2011 | Miller | H04B 7/18586 |
| | | | | 370/252 |
| 2011/0143654 A1 | * | 6/2011 | Mukhija | H04B 7/18513 |
| | | | | 455/9 |
| 2014/0004789 A1 | | 1/2014 | Rozmaryn | |
| 2014/0334370 A1 | * | 11/2014 | Tan | H04L 12/12 |
| | | | | 370/311 |

* cited by examiner

FIG. 6

SYSTEMS AND METHODS FOR AUTOMATICALLY RE-RANGING A SATELLITE TERMINAL

TECHNICAL FIELD

The present disclosure relates generally to satellite networks. More particularly, some embodiments of the present disclosure are directed toward systems and methods for automatically re-ranging a satellite terminal.

BACKGROUND

Modern satellite communication systems provide a robust and reliable infrastructure to distribute voice, data, and video signals for global exchange and broadcast of information. These satellite communication systems have emerged as a viable option to terrestrial communication systems for carrying data traffic such as Internet traffic. A typical satellite Internet system comprises subscriber terminals, a satellite, a ground station, and connectivity to the internet. Communication in such a system occurs along two links: 1) an uplink (or inroute) from a subscriber terminal to the satellite to the ground station to the gateway to the internet; and 2) a downlink (or outroute) from the internet to the gateway to the ground station to the satellite to the subscriber terminal.

During initial installation of a satellite terminal, a ranging process is performed. During ranging, the terminal transmits a signal across available inroute (uplink) frequency channels for a given transmit symbol rate, and receives signal to interference-plus-noise ratio (SINR) measurements for each transmission from a satellite gateway. The terminal also receives a signal for its assigned outroute (downlink) frequency channel, and determines the SINR of the outroute channel. The SINR is determined by the ratio of the signal power divided by the combination of the thermal noise power and the power level of other sources of interference. The ranging process is repeated for each available transmit symbol rate in the network. Based on this ranging process, the terminal determines a baseline for transmission rates it may operate at (channels it may operate on), and correspondingly, the appropriate baseline power setting to use at each rate. The outroute SINR is also stored as part of the ranging process.

Multiple problems may arise following the installation of a satellite terminal. First a satellite terminal installation may occur during poor weather (e.g., rain or snow). Establishing baseline transmission rates in poor weather may limit the possible transmit rates the satellite terminal is capable of operating on during clear sky conditions. Second, the transmit performance of the terminal may degrade over time following a poor mechanical installation of the terminal antenna system. In such an installation, the antenna of the terminal may misalign over time, thereby leading to reductions in the terminal's transmit rates and incorrect baseline power settings for the terminal. Further, still, seasonal changes may cause "drifting" in the transmit characteristics determined during initial installation. For example, tree leaf growth and loss may change the transmit rates and power settings required by a satellite terminal.

Accordingly, it is important for a terminal to redo the ranging process to reestablish the transmit settings when these problems arise. Additionally, it is important to determine which terminals were poorly installed.

The conventional process of addressing these problems relies on a manual determination of whether ranging is needed. In this manual process, satellite network personnel manually examine transmit statistics of each terminal over tens of thousands of terminals. Based on this examination, it is determined if a significant sustained change has occurred in the satellite terminal's transmit performance. If a change has occurred, the ranging process is manually initiated by issuing a ranging command to the terminal from a satellite gateway. Accordingly, the conventional process is a cumbersome and manual-labor intensive process that cannot reliably and dynamically identify the terminals that need ranging.

SUMMARY

Systems and methods are provided in various embodiments for automatically re-ranging a satellite terminal. In one embodiment, a satellite system may include a satellite comprising an inroute channel and an outroute channel; a terminal configured to receive an outroute signal from the satellite on the outroute channel and transmit an inroute signal to the satellite on the inroute channel; one or more processors; and one or more non-transitory computer-readable mediums operatively coupled to at least one of the one or more processors and having instructions stored thereon that, when executed by at least one of the one or more processors, cause at least one of the one or more processors to: monitor the quality of the outroute signal; monitor the quality of the inroute signal; determine if there has been a degradation in the monitored inroute signal quality or the monitored outroute signal quality; and automatically cause the terminal to perform ranging based on the determination. In particular implementations of this embodiment, the satellite terminal, a satellite gateway, or some combination thereof may comprise the one or more processors.

In accordance with one embodiment of the technology disclosed herein, the satellite terminal determines that there are clear sky conditions before performing ranging. In another embodiment, the satellite terminal resets one or more filters used to monitor inroute signal or the outroute signal after the terminal performs ranging.

In accordance with another embodiment of the technology disclosed herein, a satellite terminal automatically performs a first ranging process; determines a first filter for an outroute signal quality during the first ranging process; receives an outroute signal from a satellite on an outroute channel; monitors the quality of the received outroute signal quality using a second filter; and based on the first and the second filters determines if a difference between the ranging outroute signal quality and the monitored outroute signal quality is greater than a threshold. In implementations of this embodiment, a counter filter is incremented by one based on a determination that the difference between the ranging outroute signal quality and the monitored outroute signal quality is greater than the threshold. In yet further implementations of this embodiment, the terminal automatically performing a second ranging process if the counter filter exceeds a predetermined threshold.

In accordance with yet another embodiment of the technology disclosed herein, a satellite terminal transmits an inroute signal to a satellite on an inroute channel; periodically receives from the satellite a signal to noise information of the inroute signal; periodically determines a first system tracking filter (STF) for tracking a power error bias of the inroute signal based on the received signal to noise information; and periodically updates a second system tracking filter (STF) for tracking a power error bias of the inroute signal based on the periodically determined first STFs. In implementations of this embodiment, the satellite terminal performs a first ranging process prior to transmitting the inroute signal to the satellite, wherein the first ranging process establishes baseline power transmission settings for the terminal on the inroute channel. In yet further implementations of this embodiment, the satellite terminal automatically performs a second ranging process if the power error bias tracked by the second STF exceeds or falls below a predetermined threshold.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for automatically determining that a sustained change in the transmit performance of a satellite terminal has occurred. The disclosed technique permits a satellite terminal itself to automatically recognize that a significant and sustained signal quality improvement or degradation has occurred. Based on this determination, the satellite terminal may automatically initiate a ranging process on its own.

As discussed above, during ranging a satellite terminal measures the signal quality on both the inroute and outroute channels to determine a baseline for transmission rates it may operate on along with the appropriate baseline powers. The technology disclosed herein may be used to automatically track both the inroute signal quality from and outroute signal quality to a satellite terminal. If significant and sustained deviations in the outroute signal quality, inroute signal quality, or both are detected since last ranging, the terminal automatically performs ranging again. Accordingly, the terminal automatically determines a new baseline for transmission rates and the associated power settings.

Thus, the disclosed technique provides the benefit of quickly identifying and rectifying issues associated with the terminal's transmit characteristics. For example, the disclosed technique may be used to automatically recognize 1) terminal installations done in poor weather and 2) sustained degraded terminal performance due to factors such as poor terminal installation or seasonal changes. Further still, the disclosed technique provides the benefit of eliminating any costs associated with human personnel manually identifying terminals that need ranging.

Figure 1:
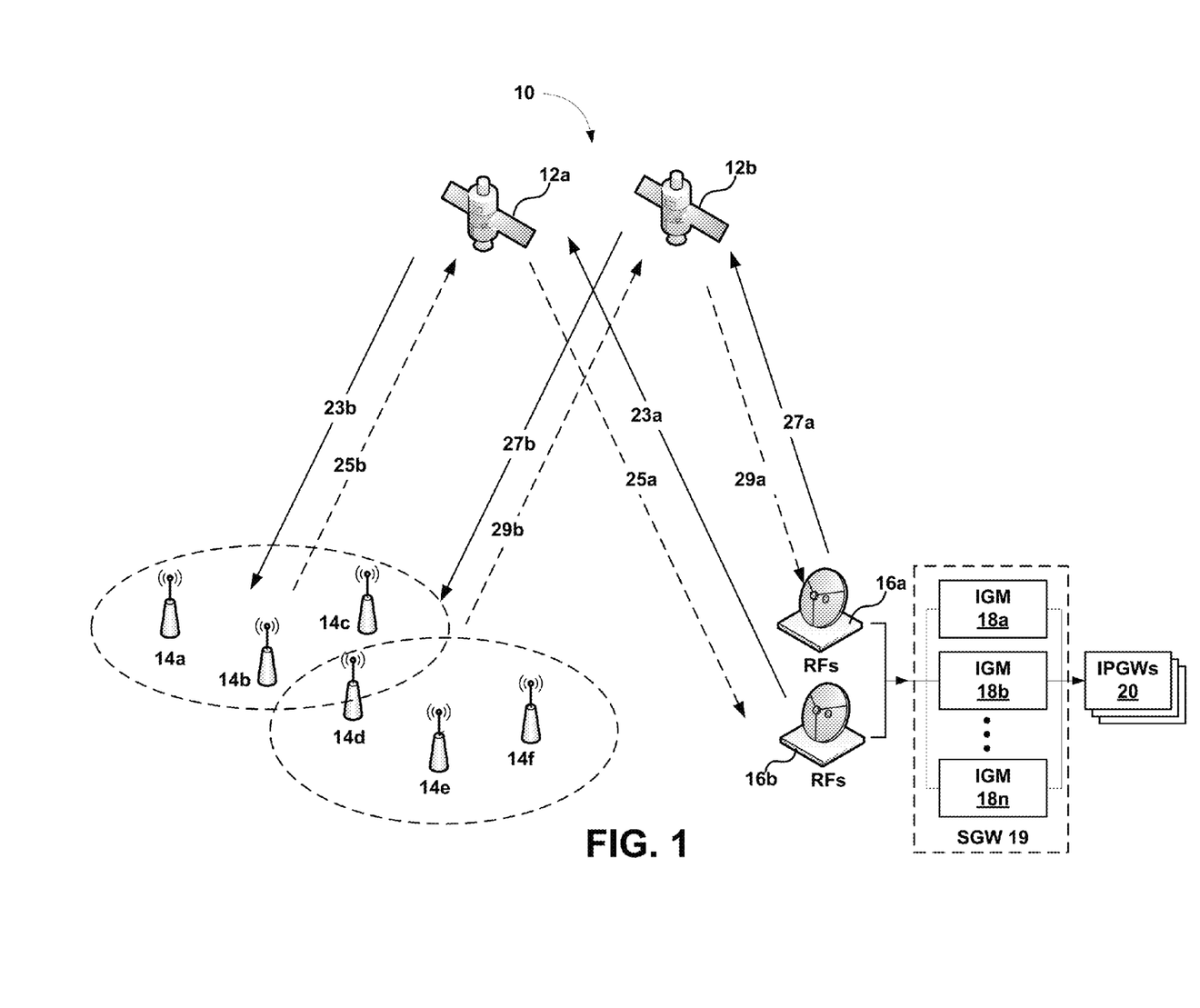
FIG. 1 illustrates an example multi-satellite data transmission system in which various embodiments of the disclosure may be implemented.

FIG. 1 illustrates an example satellite network 10 in which elements involved in satellite communications/traffic are described. Satellite network 10 in this example can include multiple satellites 12a and 12b, remote terminals 14a-14f, radio frequency (RF) terminals 16a and 16b, multiple inroute group managers (IGMs) 18a, 18b, . . . 18n, satellite gateway (SGW) 19, and IP gateways (IPGWs) 20. The satellite network may be a shared access broadband network. Other types of shared access networks may include, for example, wireless networks such as $4^{th}$ Generation Long Term Evolution (4G LTE) and WiMAX networks, which may include terminals other than Very Small Aperture Terminals (VSATs), such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band, Ku-band or C-band. Satellites 12a and 12b may use one or more spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 32-APSK. The signals intended to pass through satellites 12a and 12b in the return direction (from terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to a single IGM. The bandwidth of RF terminals 16a and 16b can be shared amongst IPGWs 20. At each of IPGWs 20, real-time (RT) and non-real-time (NRT) traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from an internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IPGWs 20 using return downlinks 25a and 29a.

Each of remote terminals 14a-14f can be, for example, VSATs and may connect to the Internet through satellites 12a and 12b and IPGWs 20/SGW 19. For example, remote terminal 14a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12a, as well as a satellite modem and other equipment for managing the sending and receiving of data. They may also include one or more remote hosts, which may be computer systems or other electronic devices capable of network communications at a site.

At SGW 19, one or more IGMs can be implemented (IGMs 18a, 18b, . . . 18n). These IGMs may be bandwidth controllers running bandwidth allocation algorithms. The IGMs may manage bandwidth of the remote terminals 14a-14f in the form of inroute groups (IGs), based in part on bandwidth demand requests from the remote terminals 14a-14f.

During initial installation, each of remote terminals 14a-14f performs a ranging process to determine the SINR of inroute and outroute frequency channels. Based on this ranging process, each terminal 14a-14f determines a baseline for transmission rates it may operate at and the appropriate baseline power setting to use at each rate. Over time, the baseline transmission rates and power settings established during this initial ranging process may be incorrect for reasons such as an installation in poor weather, a poor mechanical installation, seasonal foliage variations, and the like. Accordingly, the systems and methods disclosed herein allow each of terminals 14a-14f to automatically determine when a new ranging process needs to be performed to correct the baseline transmission rates and power settings.

Figure 2:
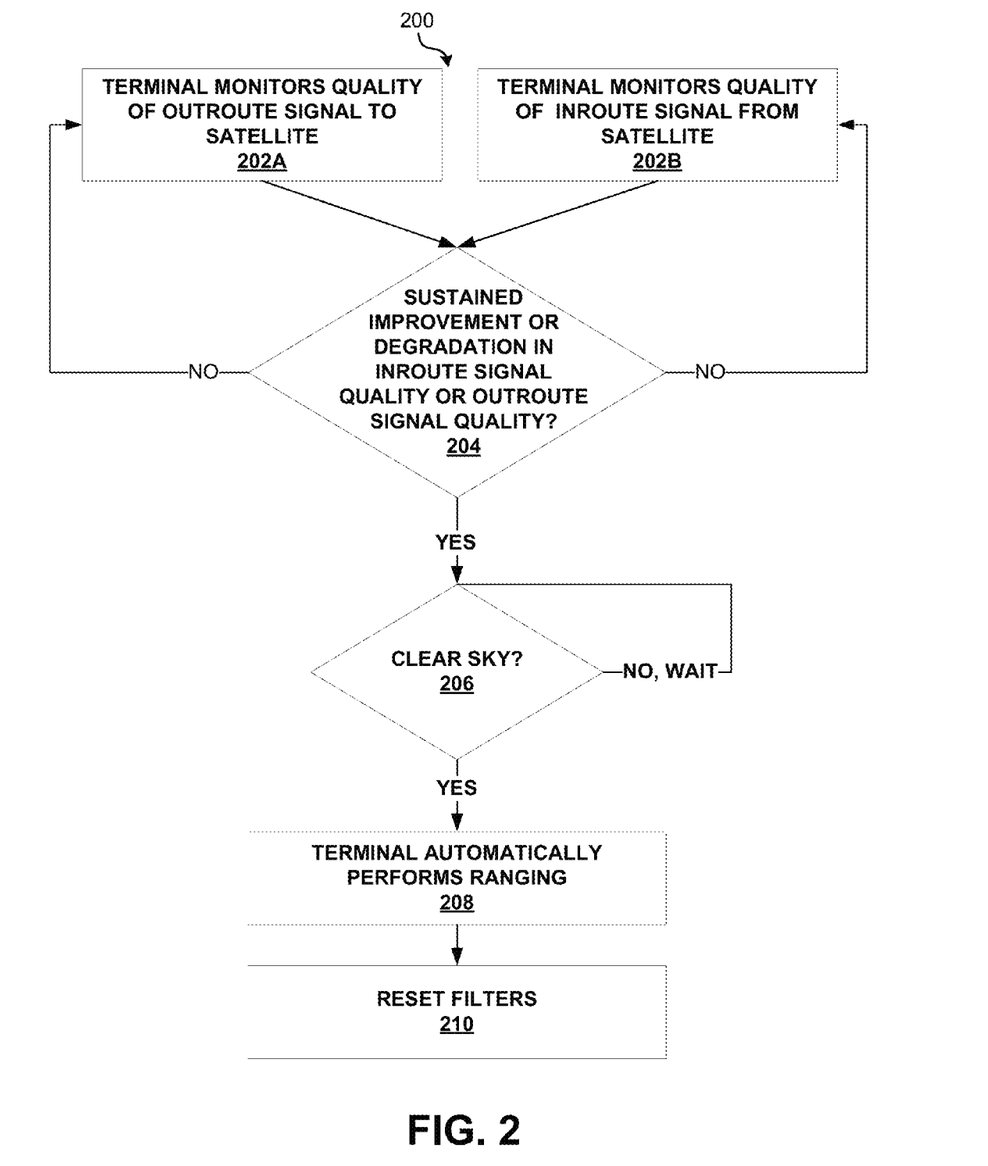
FIG. 2 is an operational flow diagram illustrating an example method 200 that may be implemented by a terminal to automatically determine if ranging needs to be performed.

FIG. 2 is an operational flow diagram illustrating an example method 200 that may be implemented by a terminal to automatically determine if ranging needs to be performed. It should be noted that although method 200 is described with reference to a terminal implementing all of the operations, in some embodiments a satellite gateway may implement some or all of the operations of method 200. For example, a satellite gateway may monitor the quality of inroute signals and automatically command a terminal to perform ranging. It should also be noted that method 200 may be repeated after each ranging process to correct the baseline transmission rates and power settings since the ranging process.

With reference now to method 200, at operations 202A and 202B, a terminal monitors the quality of its outroute (downlink) signal from a satellite and the quality of its inroute (uplink) signal to a satellite. In various embodiments, monitoring of the outroute signal (202A) and monitoring of the inroute signal (202B) may be performed as parallel or sequential processes. Monitoring of the inroute signal and outroute signal may be performed over the short-term (e.g., seconds and minutes), medium-term (e.g., minutes and hours), long-term (e.g., days, weeks, and months) or some combination thereof.

With reference to monitoring the outroute signal quality (operation 202A), when the outroute signal is transmitted from a satellite to a terminal, the power of that signal is held constant using automatic level control (ALC). Because the power of the signal is held constant using ALC, the signal power provides a reliable indicator of the downlink fade due to changes in atmospheric conditions. Accordingly, in various embodiments the terminal may demodulate the signal and calculate the carrier-to-noise (C/N) ratio over various intervals to monitor the downlink fade. It is worth noting that the C/N ratio may be calculated based on the SINR and corresponding bandwidth of the outroute carrier.

In these embodiments, the measured C/N ratio may be filtered using a short-term filter (e.g., for a period of seconds), a medium-term filter (e.g., for a period of minutes), and a long-term filter (e.g., for a period of hours or days). Accordingly, the short-term and medium-term filters may be used to determine the average outroute signal quality over shorter periods while the long-term filter may be used to determine the average outroute-signal quality over a longer period. In alternative embodiments, the terminal may forward the C/N ratio measurements to a satellite gateway, which then keeps track of some combination of short-term, medium-term, and long-term filters associated with the terminal.

In various embodiments, the filters used to determine the average outroute signal quality are Infinite Impulse Response (IIR) filters that are used to average or smooth the associated value over a period of time. In implementations of these embodiments, an exponential moving average of the signal quality may be calculated over time where an associated alpha smoothing factor is based on a desired time duration.

In one embodiment, the short-term and medium-term filters may be used to monitor current atmospheric conditions while the long-term filter is used to monitor long-term atmospheric conditions. In this embodiment, the long-term filter may be used as a reference for what the signal to noise ratio should be during clear sky conditions. In implementations of this embodiment, the signal to noise ratio tracked by the long-term filter may be compared to the signal to noise ratio determined by the terminal during a last ranging process. In this way, the atmospheric fade at the time of ranging may be determined. For example, a medium-term filter may have been used to determine the signal to noise ratio during ranging.

With reference now to monitoring the inroute signal quality (operation 202b), when the inroute signal is transmitted from the terminal to the satellite, the terminal decides what signal power to transmit with on a particular transmit rate. Before describing embodiments of operation 202b, it is useful to describe the functionality of an example power control system that may be used to monitor power control errors in the terminal's transmissions. There are two important considerations in such a power control system. First, at the time of ranging the terminal establishes baseline power settings that define power attenuation values for reaching a signal quality at a particular transmit rate. Second, for every signal burst received from the terminal, the gateway may demodulate it, calculate a SINR, and then send back the SINR to the terminal.

Accordingly, the example power control system may use a short-term system tracking filter (STF) to track a short-term power control error bias (e.g., over 3 seconds) based on a comparison of the target power attenuation (established at ranging) to the received signal to noise information. More particularly, the short-term STF may capture transmit power control errors and filter and average them out over a short term (e.g., seconds). During subsequent transmissions, the terminal may adjust its target power based on the power control error bias tracked by the short-term STF.

For example, consider a terminal that initially ranges in poor weather (e.g. rain) and establishes a baseline power attenuation value of 1 dB for a given rate. If the terminal subsequently transmits at that rate in good weather and determines an available attenuation of 6 dB (based on the received signal to noise ratio information), then the short term power control error is +5 dB. Subsequently, the terminal may adjust its power and operate in an over-powered mode relative to its ranged values. As another example, consider a terminal with a poor mechanical installation that establishes a baseline power attenuation value of 7 dB for a given rate. Over time, the antenna of the terminal may become misaligned. Thus, when the terminal subsequently transmits at the same rate, it may determine an available attenuation of only 3 dB, so the power control error is −4 dB. Subsequently, the terminal may adjust its power and operate in an under-powered mode compared to its ranged values.

Although the short-term STF provides a good indication of a current power control error bias due to a current transmit operating conditions (e.g. weather conditions), it is not indicative of whether there is a significant and persistent long-term bias (positive or negative) in the power control error. Accordingly, in various embodiments the terminal may monitor the inroute signal quality by using a long-term STF to track a persistent power control error bias by comparing the target power attenuation to the received signal to noise ratio information over a long period of time. For example, in various embodiments the long-term STF may track a power control error bias over a day, a few days, a week, a few weeks, or longer.

In one embodiment, a long-term positive bias of the power control error is tracked. A long-term positive bias indicates that the current transmit power needed is consistently more than the ranged value, suggesting that the signal level has degraded since the last ranging process, or that the noise floor has increased. In another embodiment, a long-term negative bias of the power control is tracked. A long-term negative bias indicates that the current transmit power needed is consistently less than the ranged value, suggesting that ranging happened in rain or a degraded condition. In further embodiments, both a negative and positive bias may be tracked in the long term. In various embodiments, the long-term STF may track a power control error bias over several hours, a few days, a few weeks, or longer.

Once the outroute signal quality and inroute signal quality are monitored, the terminal or gateway may subsequently determine if the terminal needs to perform ranging. Accordingly, with reference now to method 200, at decision 204 it is determined if there has been a sustained change (improvement or degradation) in the inroute signal quality, the outroute signal quality, or both. For example, determination of whether there has been a sustained change in the outroute signal quality may be based on whether the long-term outroute carrier to noise ratio exceeds the ranging carrier to noise ratio by a predetermined threshold. As another example, determination of whether there has been a sustained change in the inroute signal quality may be based on whether the long-term power control bias error exceeds a predetermined threshold. In one particular embodiment, the predetermined threshold may be between 0.5 and 6 dB.

If there has not been a sustained change, then operations 202A and 202B may iteratively repeat until a sustained change is detected. In various embodiments, decision 204 may be periodically performed based on a user-configurable timescale (e.g., hours, days, weeks, etc.) In implementations of these embodiments, the period of checking whether there has been a sustained change in outroute signal quality may be different than the period of checking whether there has been a sustained change in inroute signal quality.

On the other hand, if there has been a sustained change in the inroute signal quality, the outroute signal quality, or both, method 200 may proceed to operations 206-210. At decision 206, the terminal determines if there are current clear sky conditions. In one embodiment, the terminal makes this determination by comparing the short term outroute signal quality with the long term out route signal quality. For example, if the difference between the signal qualities is less than a configurable threshold (e.g., 0.5 dB), then the terminal may make the determination that it is operating in clear sky conditions. If there are not clear sky conditions, the terminal waits for clear sky conditions. Once there are clear sky conditions, at operation 208 the terminal automatically performs ranging, thereby establish a new baseline for transmission rates it may operate at and the appropriate baseline power setting to use at each rate. Because the terminal performs ranging in clear sky conditions, during subsequent operation the satellite terminal does not operate underpowered in good weather. Following the ranging process, at operation 210 the terminal may reset any filters or parameters (e.g. long-term STF for power control error bias) it used to monitor inroute and outroute signal quality and perform method 200 again.

Figure 3:
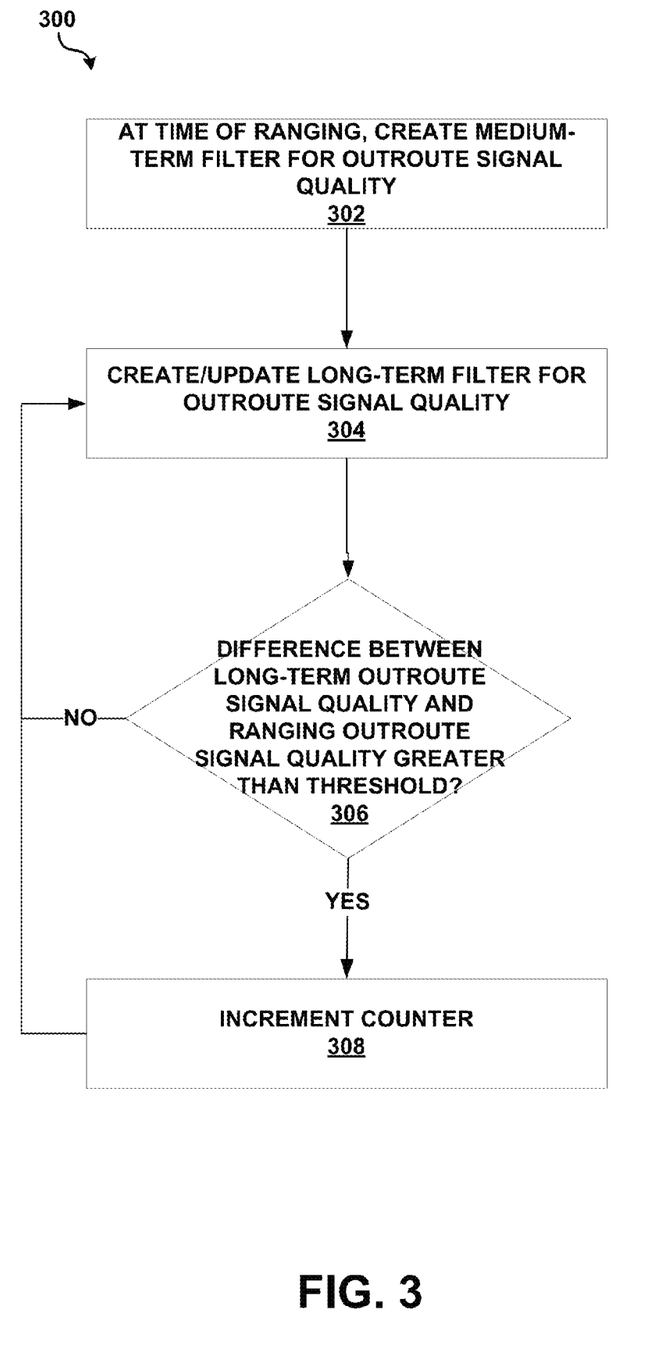
FIG. 3 is an operational flow diagram illustrating a particular method of monitoring the outroute signal quality.

FIG. 3 is an operational flow diagram illustrating a particular method 300 of monitoring the outroute signal quality. At operation 302, at the time of ranging the terminal creates a medium-term filter for the outroute signal quality. In one mathematical implementation, operation 302 may be expressed as Equation (1):

$$\left[\frac{C}{N}\right]^R_{OR} = \left[\frac{C}{N}\right]^{m\_avg}_{OR} \qquad (1)$$

Where C/N is the carrier to noise ratio or signal quality, the subscript OR stands for an outroute signal received from the satellite, the superscript R means that the carrier to noise ratio is acquired at the time of ranging, and the superscript m_avg stands for the medium term average. In other words, the carrier to noise ratio measured on the outroute at the time of ranging is set equal to a medium-term (e.g. several seconds or a few minutes) average filter of the outroute signal quality. This medium-term filter representing the average ranging outroute signal quality may be stored at the terminal or forwarded to a satellite gateway or both.

Subsequently, at operation 304 a long-term filter for the outroute signal quality is created over time. For example, the long-term filter for the outroute signal quality may be created by taking a running-average of a short-term average filter of the outroute signal quality, a medium-term average filter of the outroute signal quality, or some combination thereof. The running average may be taken over a predetermined period of time to establish an initial long-term filter (e.g., a few hours or days). Additionally, it is worth noting that the filters used in the running-average may be weighed differently depending on when they were taken.

Following creation of the long-term filter, at decision 306 it is determined if the difference between the long-term outroute signal quality and ranging outroute signal quality is greater than a predetermined threshold. For example, in one particular embodiment the range of the predetermined threshold may be set between 0.5 and 6 dB. If the determined difference between the long-term and ranging outroute signal quality is not greater than the predetermined threshold, then process 300 returns to operation 304 (i.e. updating the long-term filter). If it is, at operation 308 a counter is incremented. In this way, the running counter may keep track of a persistent bias (positive or negative) between long-term filter of outroute signal quality and the ranging time filter of outroute signal quality. In one embodiment, this comparison may be periodically made after a predetermined number of hours (e.g. 1 to 24) or days (e.g. 1 or more). If the counter is incremented enough times, this may be an indication that ranging is needed. In one mathematical implementation, decision 306 and operation 308 may be expressed as Equation (2):

$$\text{if } \left(\left|\left[\frac{C}{N}\right]^{l\_avg}_{OR} - \left[\frac{C}{N}\right]^R_{OR}\right| > Th_{OR\_SQF\_Conf}\right) \qquad (2)$$

then OR_SQF_Conf = OR_SQF_Conf + 1

Where $Th_{OR\_SQF\_Conf}$ is a configurable threshold difference between the outroute long-term signal quality and the outroute signal quality determined at the time of ranging, and where OR_SQF_Conf is a counter that is incremented if the absolute value of the difference is greater than the threshold.

Figure 4:
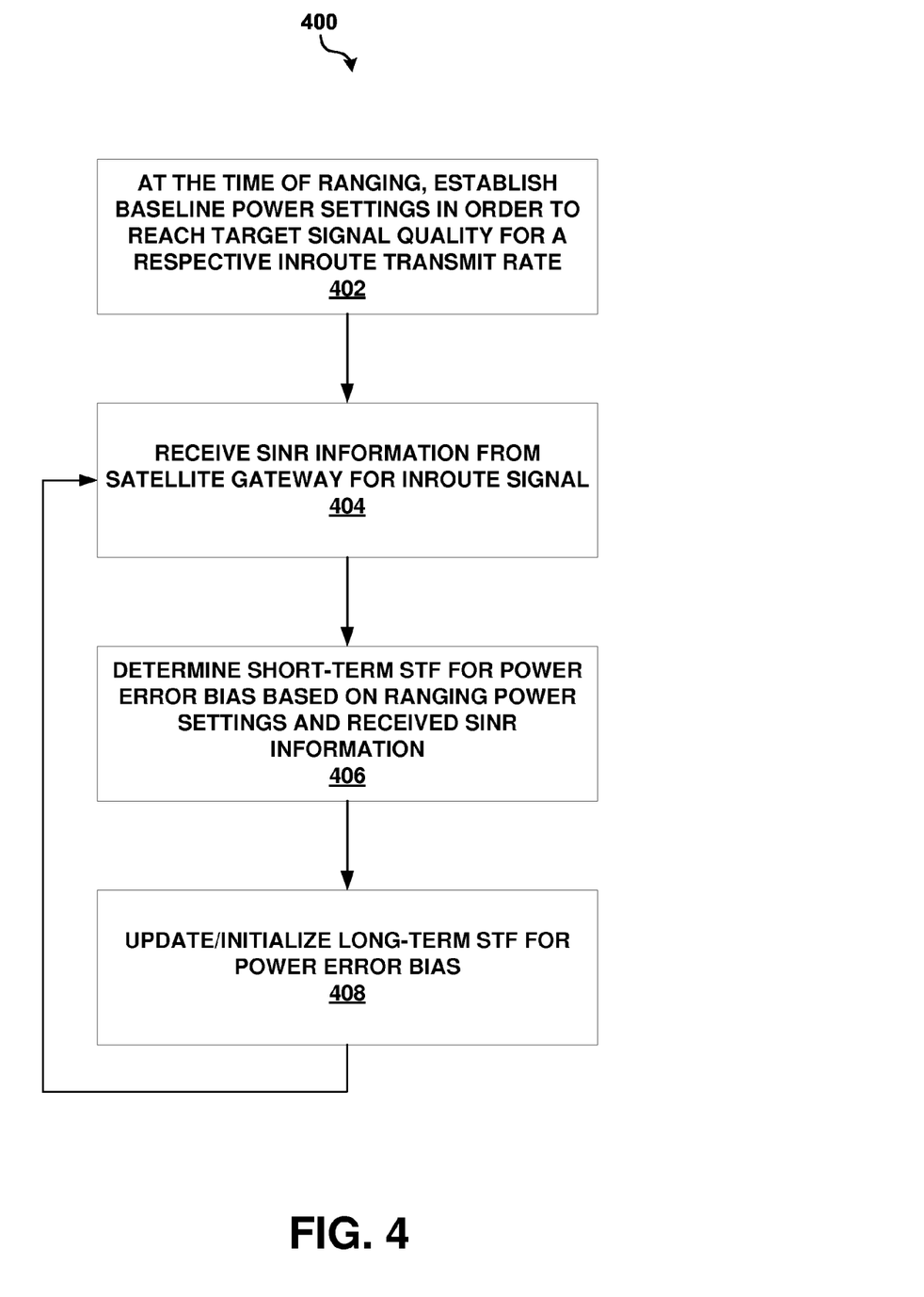
FIG. 4 is an operational flow diagram illustrating a particular method of monitoring the inroute signal quality.

FIG. 4 is an operational flow diagram illustrating a particular method 400 of monitoring the inroute signal quality based on a long-term STF for power control error bias. At operation 402, the terminal establishes baseline power settings during ranging that specify target powers to reach a target signal quality for a respective inroute transmit rate. At operation 404, the terminal receives SINR information from a satellite gateway for the inroute signal transmitted from the terminal to the satellite gateway. Based on this received SINR information, at operation 406 the terminal may determine a short-term STF for power error bias.

In various embodiments, the short-term STF for the power error bias may be determined using an infinite impulse response (IIR) filter. In various implementations of these embodiments, the time scale of the short-term STF may be set to seconds, minutes, hours, or longer. At operation 408, a long-term STF for the power control error bias may be created or initialized based on a short-term STF. In various implementations, the time scale of the long-term STF may be set to days, weeks, or longer. Subsequently, operations 404-408 are iteratively repeated to update the long-term STF.

In one mathematical implementation, operations 406-408 may be expressed as Equations (3) and (4):

$$P_{STF\_Bias}(+) = \alpha_{STF\_Bias} \cdot P_{STF\_Bias}(-) + (1 - \alpha_{STF\_Bias}) \cdot P_{STF}(+) \qquad (3)$$

$$\alpha_{STF\_Bias} = 1 - \frac{1}{\tau_{STF\_Bias}} \qquad (4)$$

Where $P_{STF\_Bias}$ (+) is the updated long-term STF bias, $\alpha_{STF\_Bias}$ is a configurable weight that weighs the latest STF short-term filter value, $P_{STF\_Bias}$ (−) is the previous long-term STF bias, $P_{STF}(+)$ is the current short-term STF value, and τ is a configurable time constant. In various embodiments, τ may be configured based on a desired short-term STF filtering rate (e.g. minutes, hours, days, weeks, etc.)

With reference again to FIG. 2, in one mathematical implementation based on Equations (1) through (4), operation 204 may be expressed by Equation (5):

$$(OR\_SQF\_Conf \geq \alpha_{conf} * 24 * N/M) \text{ AND/OR}$$
$$(|P_{STF\_Bias}| > Th_{STF\_Bias}) \qquad (5)$$

Where OR_SQF_Conf is a counter, $\alpha_{conf}$ is a configurable confidence factor, N is a configurable number of days, M is a configurable calculation interval in hours, $P_{STF\_Bias}$ is the power control error bias from the long-term STF, and $Th_{STF\_Bias}$ is a configurable threshold power control error bias. The first parenthesis of Equation (5) determines if the long-term outroute C/N ratio exceeds or falls below the ranging C/N ratio by a threshold for a predetermined number of times (i.e. the counter exceeds a value) over a configurable time interval. The second parenthesis of Equation (5) determines if the absolute value of the long-term power control error bias exceeds a predetermined threshold. In this mathematical implementation, re-ranging may be forced in clear skies if either expression is true. Following re-ranging, OR_SQF_Conf and $P_{STF\_Bias}$ may be reset to zero. Table 1 illustrates an example range of values that may be used for each of the above-described parameters in particular implementations of the technology disclosed herein.

TABLE 1

| Parameters | | | | |
|---|---|---|---|---|
| Parameter | Symbol | Min | Max | Units |
| Counter Calculation Interval | M | | 1 24 | hours |
| Counter Threshold | $Th_{OR\_SQF\_Conf}$ | 0.5 | 6 | dB |
| Bias Filter Time Constant | $\tau_{STF\_Bias}$ | 86400 | 604800 | s |

TABLE 1-continued

Parameters

| Parameter | Symbol | Min | Max | Units |
|---|---|---|---|---|
| Re-range Trigger Interval | N | 3 | 30 | days |
| Bias Threshold | $Th_{STF\_Bias}$ | 0.5 | 6 | dB |
| Confidence Factor | $\alpha_{conf}$ | 0.1 | 1 | n/a |

Figure 5:
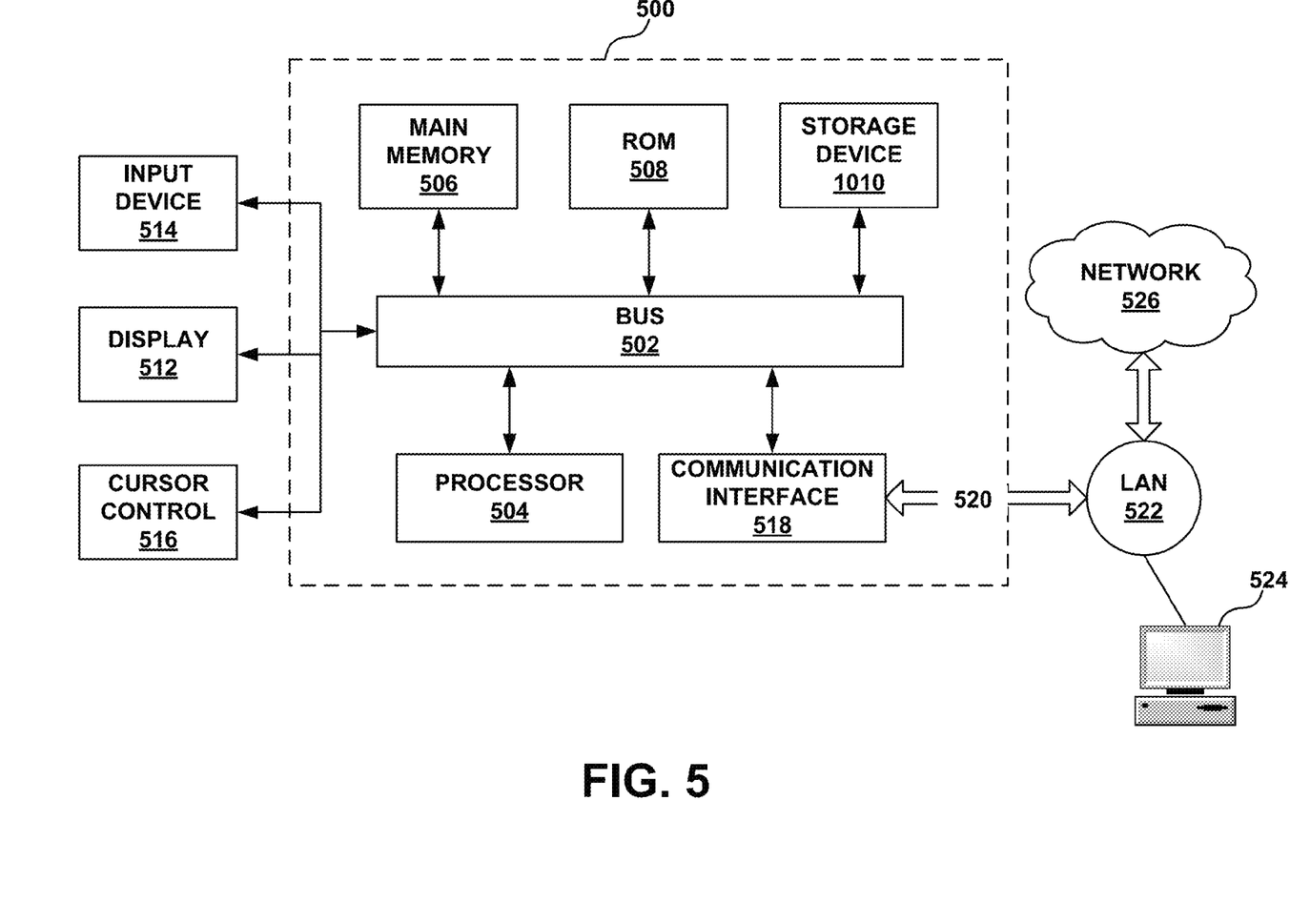
FIG. 5 illustrates an example computing module that may be used in implementing features of various embodiments.

FIG. 5 illustrates a computer system 500 upon which example embodiments according to the present disclosure can be implemented. Computer system 500 can include a bus 502 or other communication mechanism for communicating information, and a processor 504 coupled to bus 502 for processing information. Computer system 500 may also include main memory 506, such as a random access memory (RAM) or other dynamic storage device, coupled to bus 502 for storing information and instructions to be executed by processor 504. Main memory 506 can also be used for storing temporary variables or other intermediate information during execution of instructions to be executed by processor 504. Computer system 500 may further include a read only memory (ROM) 508 or other static storage device coupled to bus 502 for storing static information and instructions for processor 504. A storage device 510, such as a magnetic disk or optical disk, may additionally be coupled to bus 502 for storing information and instructions.

Computer system 500 can be coupled via bus 502 to a display 512, such as a cathode ray tube (CRT), liquid crystal display (LCD), active matrix display, light emitting diode (LED)/organic LED (OLED) display, digital light processing (DLP) display, or plasma display, for displaying information to a computer user. An input device 514, such as a keyboard including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

According to one embodiment of the disclosure, automatic satellite terminal ranging, in accordance with example embodiments, are provided by computer system 500 in response to processor 504 executing an arrangement of instructions contained in main memory 506. Such instructions can be read into main memory 506 from another computer-readable medium, such as storage device 510. Execution of the arrangement of instructions contained in main memory 506 causes processor 504 to perform one or more processes described herein. One or more processors in a multi-processing arrangement may also be employed to execute the instructions contained in main memory 506. In alternative embodiments, hard-wired circuitry is used in place of or in combination with software instructions to implement various embodiments. Thus, embodiments described in the present disclosure are not limited to any specific combination of hardware circuitry and software.

Computer system 500 may also include a communication interface 518 coupled to bus 502. Communication interface 518 can provide a two-way data communication coupling to a network link 520 connected to a local network 522. By way of example, communication interface 518 may be a digital subscriber line (DSL) card or modem, an integrated services digital network (ISDN) card, a cable modem, or a telephone modem to provide a data communication connection to a corresponding type of telephone line. As another example, communication interface 518 may be a local area network (LAN) card (e.g. for Ethernet™ or an Asynchronous Transfer Model (ATM) network) to provide a data communication connection to a compatible LAN. Wireless links can also be implemented. In any such implementation, communication interface 518 sends and receives electrical, electromagnetic, or optical signals that carry digital data streams representing various types of information. Further, communication interface 518 may include peripheral interface devices, such as a Universal Serial Bus (USB) interface, a PCMCIA (Personal Computer Memory Card International Association) interface, etc.

Network link 520 typically provides data communication through one or more networks to other data devices. By way of example, network link 520 can provide a connection through local network 522 to a host computer 524, which has connectivity to a network 526 (e.g. a wide area network (WAN) or the global packet data communication network now commonly referred to as the "Internet") or to data equipment operated by service provider. Local network 522 and network 526 may both use electrical, electromagnetic, or optical signals to convey information and instructions. The signals through the various networks and the signals on network link 520 and through communication interface 518, which communicate digital data with computer system 500, are example forms of carrier waves bearing the information and instructions.

Computer system 500 may send messages and receive data, including program code, through the network(s), network link 520, and communication interface 518. In the Internet example, a server (not shown) might transmit requested code belonging to an application program for implementing an embodiment of the present disclosure through network 526, local network 522 and communication interface 518. Processor 504 executes the transmitted code while being received and/or store the code in storage device 510, or other non-volatile storage for later execution. In this manner, computer system 500 obtains application code in the form of a carrier wave.

The term "computer-readable medium" as used herein refers to any medium that participates in providing instructions to processor 504 for execution. Such a medium may take many forms, including but not limited to non-volatile media, volatile media, and transmission media. Non-volatile media include, for example, optical or magnetic disks, such as storage device 510. Volatile media may include dynamic memory, such as main memory 506. Transmission media may include coaxial cables, copper wire and fiber optics, including the wires that comprise bus 502. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 6:
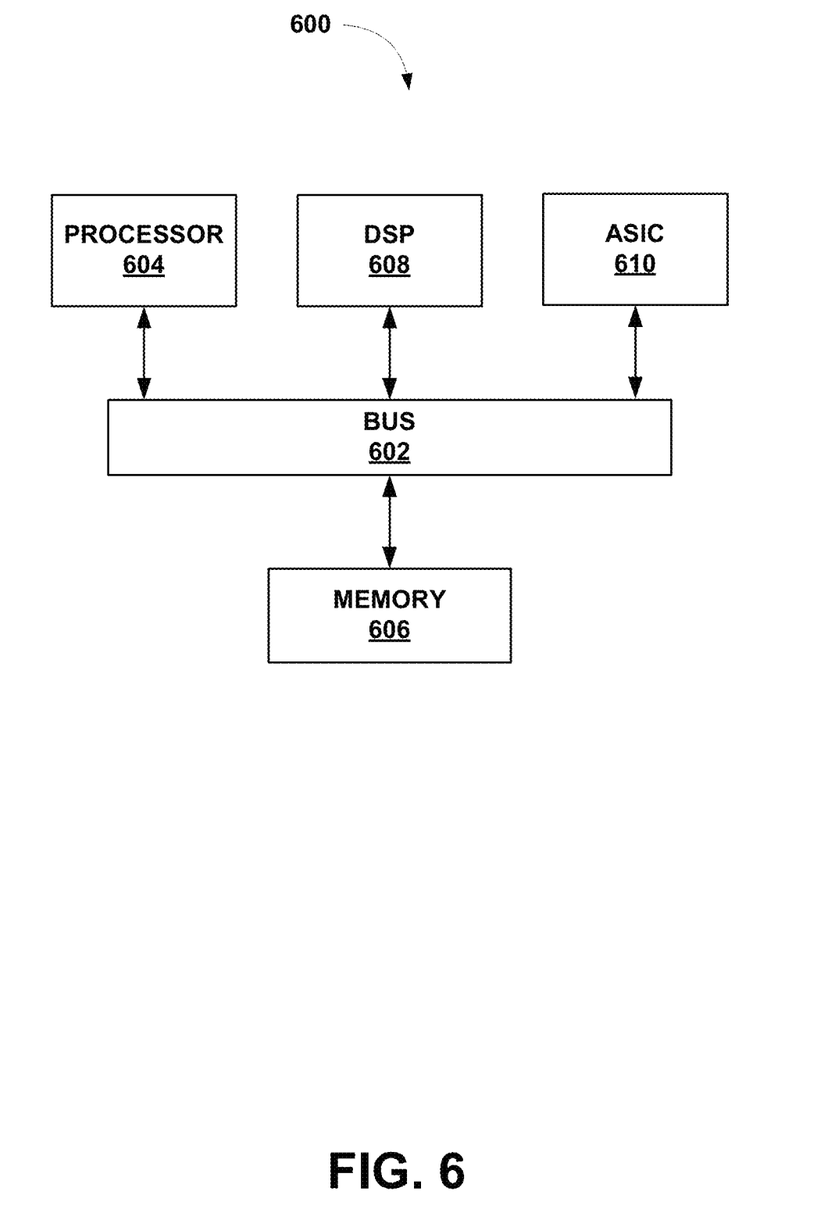
FIG. 6 illustrates an example chip set that can be utilized in implementing architectures and methods for dynamic bandwidth allocation in accordance with various embodiments.

FIG. 6 illustrates a chip set 600 in which embodiments of the disclosure may be implemented. Chip set 600 can include, for instance, processor and memory components described with respect to FIG. 6 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 600 includes a communication mechanism such as a bus 602 for passing information among the components of the chip set 600. A processor 604 has connectivity to bus 602 to execute instructions and process information stored in a memory 606. Processor 604 includes one or more processing cores with each core configured to perform independently. A multi-core processor enables multiprocessing within a single physical package. Examples of a multi-core processor include two, four, eight, or greater numbers of processing cores. Alternatively or in addition, processor 604 includes one or more microprocessors configured in tandem via bus 602 to enable independent execution of instructions, pipelining, and multithreading. Processor 604 may also be accompanied with one or more specialized components to perform certain processing functions and tasks such as one or more digital signal processors (DSP) 608, and/or one or more application-specific integrated circuits (ASIC) 610. DSP 608 can typically be configured to process real-world signals (e.g., sound) in real time independently of processor 604. Similarly, ASIC 610 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 604 and accompanying components have connectivity to the memory 606 via bus 602. Memory 606 includes both dynamic memory (e.g., RAM) and static memory (e.g., ROM) for storing executable instructions that, when executed by processor 604, DSP 608, and/or ASIC 610, perform the process of example embodiments as described herein. Memory 606 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a satellite comprising an inroute channel and an outroute channel;
a terminal configured to receive an outroute signal from the satellite on the outroute channel and transmit an inroute signal to the satellite on the inroute channel;
one or more processors; and
one or more non-transitory computer-readable mediums operatively coupled to at least one of the one or more processors and having instructions stored thereon that, when executed by at least one of the one or more processors, cause at least one of the one or more processors to:
monitor the quality of the outroute signal using at least a first filter that tracks a carrier to noise ratio of the outroute signal over time;
monitor the quality of the inroute signal using at least a second filter that tracks a power error bias of the inroute signal over time, wherein the power error bias is tracked using at least a baseline power transmission setting established for the terminal on the inroute channel during a first ranging process;
determine if there has been a degradation in the monitored inroute signal quality or the monitored outroute signal quality, wherein a degradation in the monitored outroute signal quality is determined using at least a comparison of the first filter and an outroute signal quality filter determined using at least a carrier to noise ratio of the outroute signal during the first ranging process; and
automatically cause the terminal to perform a second ranging process based on the determination.

2. The system of claim 1, wherein the terminal comprises the one or more processors.

3. The system of claim 1, wherein the terminal and a satellite gateway comprise the one or more processors.

4. The system of claim 1, wherein the instructions when executed by at least one of the one or more processors, further cause at least one of the one or more processors to determine there are clear sky conditions before causing the terminal to perform the second ranging process.

5. The system of claim 4, wherein the instructions when executed by at least one of the one or more processors, further cause at least one of the one or more processors to reset one or more filters used to monitor the inroute signal or the outroute signal after the terminal performs ranging.

6. A method, comprising:
using a satellite terminal to monitor a quality of an outroute signal received by the satellite terminal, wherein the outroute signal quality is monitored using at least a first filter that tracks a carrier to noise ratio of the outroute signal over time;
monitoring the quality of an inroute signal transmitted by the satellite terminal, wherein the inroute signal quality is monitored using at least a second filter that tracks a power error bias of the inroute signal over time, wherein the power error bias is tracked using at least a baseline power transmission setting established for the satellite terminal on an inroute channel during a first ranging process;
determining, using the satellite terminal, if there has been an improvement or degradation in the monitored inroute signal quality or the monitored outroute signal quality; and
the satellite terminal automatically performing a second ranging process based on the determination.

7. The method of claim 6, further comprising determining there are clear sky conditions before the satellite terminal performs the second ranging process.

8. The method of claim 7, further comprising resetting one or more filters used to monitor the inroute signal or the outroute signal after the satellite terminal performs the second ranging process.

9. A method, comprising:
a satellite terminal performing a ranging process;
the satellite terminal determining a first filter for an outroute signal quality during the ranging process;
the satellite terminal receiving an outroute signal from a satellite on an outroute channel;
monitoring a quality of the received outroute signal using a second filter, wherein the second filter has a timescale greater than a timescale of the first filter; and
based on the first and the second filters, determining if a difference between the ranging outroute signal quality and the monitored outroute signal quality is greater than a threshold.

10. The method of claim 9, wherein the timescale of the first filter is less than a five minutes, and wherein the timescale of the second filter is at least an hour.

11. The method of claim 10, wherein the step of determining if a difference between the signal qualities is greater than a threshold is periodically performed every M hours, where M is greater than or equal to 1.

12. The method of claim 9, further comprising incrementing by one a counter filter based on a determination that the difference between the ranging outroute signal quality and the monitored outroute signal quality is greater than the threshold.

13. The method of claim 12, further comprising the satellite terminal automatically performing a second ranging process if the counter filter exceeds a predetermined threshold.

14. The method of claim 13, wherein the satellite terminal automatically performs the second ranging process based on a determination that OR_SQF_Conf≥$\alpha_{conf}$*24*N/M, where OR_SQF_Conf is the counter filter, $\alpha_{conf}$ is a confidence factor, N is a number of days that the second filter has been monitored, and M is a configurable calculation interval in hours for the counter filter.

15. The method of claim 13, further comprising resetting the counter filter to zero after the satellite terminal performs the second ranging process.

16. The method of claim 13, further comprising: determining there are clear sky conditions before the satellite terminal automatically performs the second ranging process.

17. A method, comprising:
a terminal transmitting an inroute signal to a satellite on an inroute channel;
the terminal periodically receiving over a satellite network signal to interference-plus-noise ratio (SINR) information of the inroute signal;

periodically determining a first system tracking filter (STF) for tracking a power error bias of the inroute signal, wherein the power error bias is based on a comparison of the received SINR information with a baseline power transmission setting established for the terminal on the inroute channel during a first ranging process performed by the terminal; and periodically updating a second system tracking filter (STF) for tracking a power error bias of the inroute signal using at least the periodically determined first STFs.

18. The method of claim 17, further comprising the terminal performing the first ranging process prior to transmitting the inroute signal to the satellite.

19. The method of claim 18, further comprising the terminal automatically performing a second ranging process if the power error bias tracked by the second STF exceeds or falls below a predetermined threshold.

20. The method of claim 19, further comprising resetting to zero the power error bias tracked by the second STF after the terminal performs the second ranging process.

21. A satellite terminal, comprising:
one or more processors; and
one or more non-transitory computer-readable mediums operatively coupled to at least one of the one or more processors and having instructions stored thereon that, when executed by at least one of the one or more processors, cause at least one of the one or more processors to:
perform a first ranging process;
determine a first filter for an outroute signal quality during the ranging process;
after the ranging process, receive an outroute signal from a satellite on an outroute channel;
monitor the quality of the received outroute signal using a second filter, wherein the second filter has a timescale greater than a timescale of the first filter;

based on the first and the second filters, determine if a difference between the ranging outroute signal quality and the monitored outroute signal quality is greater than a threshold; and increment by one a counter filter based on a determination that the difference between the ranging outroute signal quality and the monitored outroute signal quality is greater than the threshold.

22. A satellite terminal, comprising:
one or more processors; and
one or more non-transitory computer-readable mediums operatively coupled to at least one of the one or more processors and having instructions stored thereon that, when executed by at least one of the one or more processors, cause at least one of the one or more processors to:
transmit an inroute signal to a satellite on an inroute channel;
periodically receive over a satellite network a signal to interference-plus-noise ratio (SINR) information of the inroute signal;
periodically determine a first system tracking filter (STF) for tracking a power error bias of the inroute signal, wherein the power error bias is based on a comparison of the received SINR information with a baseline power transmission setting established for the satellite terminal on the inroute channel during a first ranging process performed by the satellite terminal;
periodically update a second system tracking filter (STF) for tracking an error bias of the inroute signal using at least the periodically determined first STFs; and
performing a second ranging process if the power error bias tracked by the second STF exceeds or falls below a predetermined threshold.

\* \* \* \* \*